UNITED STATES PATENT OFFICE.

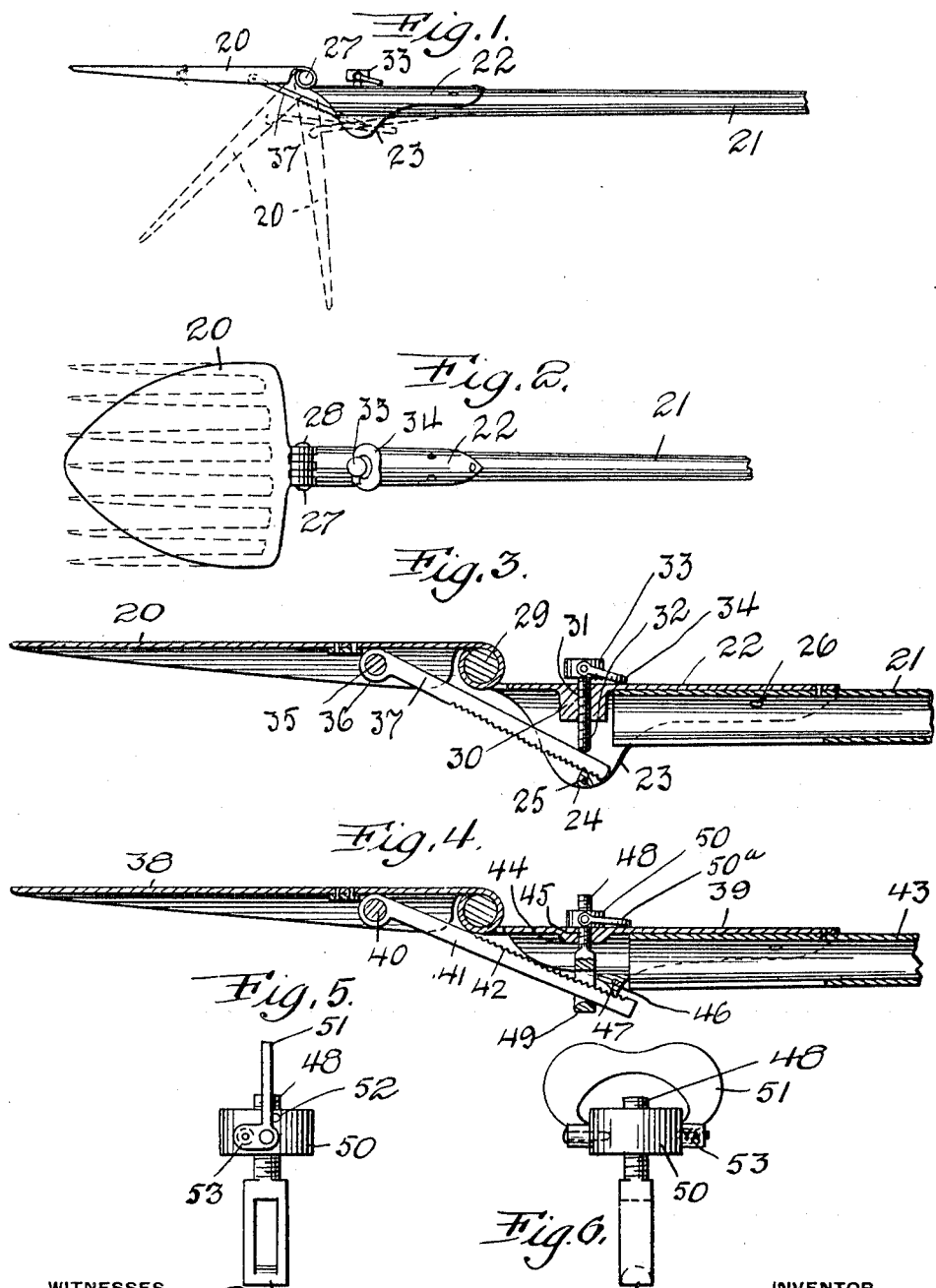

EMERY WARGA MIHÓK, OF HAMMOND, INDIANA.

AGRICULTURAL IMPLEMENT.

1,116,315.      Specification of Letters Patent.      Patented Nov. 3, 1914.

Application filed May 25, 1914. Serial No. 840,801.

*To all whom it may concern:*

Be it known that I, EMERY WARGA MIHÓK, a subject of the King of Hungary, residing at Hammond, in the caunty of Lake and State of Indiana, have invented certain new and useful Improvements in Agricultural Implements, of which the following is a specification, reference being had therein to the accompanying drawing.

This invention relates to agricultural implements and has for its object to provide means, in a manner as hereinafter set forth, for adjustably connecting the tool at various angles to the handle, and for further maintaining the implement in the position to which it has been adjusted.

Further objects of the invention are to provide an agricultural implement including an adjustable coupling means between the tool and the handle which is simple in its construction and arrangement, strong, durable, efficient and convenient in its use, readily set up and comparatively inexpensive.

With the foregoing and other objects in view, the invention conisists of the novel construction, combination and arrangement of parts as hereinafter more fully described and illustrated in the accompanying drawings wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a side elevation of an adjustable coupling means between the tool and the handle of an agricultural implement, the tool being further shown in dotted lines as adjusted; Fig. 2 is a top plan view of the implement, a tool in the form of a hoe being shown in full lines and in the form of a rake in dotted lines; Fig. 3 is a longitudinal sectional view of the implement; Fig. 4 is a longitudinal sectional view of a modified form. Fig. 5 is a front elevation, and Fig. 6 is a side elevation of certain of the elements employed in the construction shown in Fig. 4.

Referring to Figs. 1, 2 and 3 of the drawings, 20 denotes the tool of the implement, which may be a hoe or a rake, and 21 the handle. The tool 20 is connected to the handle 21 by an adjustable coupling element which consists of a body portion 22 semicylindrical in cross section and formed with a pair of depending lugs 23, which are connected together by a coupling member 24 carrying a triangular-shaped block 25.

The body portion 22 is mounted upon and projects from the handle 21. The said body portion 22 is fixedly secured to the handle 21 by a hold-fast device 26. The body portion 22 at its forward end terminates in a plurality of upwardly extending apertured ears 27, and extending between and arranged at the sides of said ears 27, are apertured lugs 28 which are formed integral with the rear end of the tool 20. A pivot pin 29 extends through the ears 27 and lugs 28 whereby the tool is pivotally connected to the body portion 22.

Formed integral with and depending from the inner face of the body portion 22, forwardly of the handle 21, is a lug 30 formed with an opening 31 having the wall thereof screw threaded. The opening 31 is arranged in alinement with the block 25, and engaging with the threads of the wall of the opening 31 is a clamping screw 32, formed with a head 33, carrying a pivoted grip or thumb piece 34.

Connected to the tool 20 is a bar 35 upon which is pivotally mounted, as at 36, the forward end of a retaining member 37, which is in the form of a toothed rack bar, and said member 37 extends between the lugs 23 and further extends between the screw 32 and block 25.

The teeth of the member 37 are adapted to be engaged by the block 25 after which the screw 32 is adjusted to engage the member 37, whereby the teeth of the member 37 are maintained in engagement with the block 25 and the tool 20 is maintained in the position to which it has been adjusted.

Referring to Figs. 4, 5 and 6 of the drawings, the tool which is indicated by the reference character 38 is pivotally connected to the body portion 39 of the adjustable coupling device in the same manner as that shown in connection with Figs. 1, 2 and 3, and the tool 38 has pivotally connected thereto, as at 40, a retaining member 41, the latter being in the form of a toothed rack bar, but with the teeth 42 thereof upon the inner edge of the member 41. The body portion 39 is connected to the handle 43 and projects forwardly therefrom, and said body portion 39 has formed integral with its inner face a depending lug 44 formed with an opening 45 having the wall thereof screw threaded. The body portion 39 is semi-cylindrical, and extending therebetween, forwardly of the handle 43, is a coupling member 46, provided with a block 47, which is triangular-shaped in cross section and reversely set up with respect to the position of the block 25 so that the block 47 will engage in the teeth 42 on the top edge of the member 41.

Engaging with the threads of the wall of the opening 45 is a threaded stem 48 which terminates at its lower end in a link 49, the latter extending from the body portion 39. The link 49 is arranged forwardly of the block 47 and the member 41 extends through said link 49 so that the teeth 42 of said member 41 can be engaged by the block 47. The link 49 is vertically adjustable through the medium of an interiorly threaded collar or nut 50 engaging witht the stem 48 exteriorly of the body portion 39, and said collar 50 is formed with a grip or finger piece 50ª.

As shown in Figs. 5 and 6, the collar 50 is provided with stops 52 to limit the movement in one direction of the grip 51, and said grip 51 is maintained in the vertical position by spring pins 53 which engage in openings in the collar 50.

In the forms shown in Figs. 4, 5 and 6, if it be desired to adjust the tool 38, the link 49 is shifted inwardly, by screwing the nut 50 upwardly, and this operation allows the member 41 to shift from engagement with the block 47, after which the member 41 can be moved rearwardly or forwardly through the link 49, as desired, and when the tool 38 has been set to the proper inclination, the nut 50 is shifted toward the body portion 39, which draws the link 49 toward said body portion 39, and brings the member 41 into engagement with the block 47, under such conditions the tool 38 is maintained in the position to which it has been adjusted.

What I claim is:—

1. An agricultural implement comprising a tool, a handle, a body portion mounted upon and projecting from said handle and pivotally connected to said tool, a toothed retaining member pivotally connected at its forward end to said tool and extending in said body portion, means carried by the body portion and engaging in said toothed member for maintaining it from movement and means carried by said body portion and engaging said member, and in connection with the first mentioned means locking said member from movement thereby preventing shifting of the tool.

2. An agricultural implement comprising a handle, a tool, a body portion secured to the handle and projecting therefrom and pivotally connected to said tool, an adjustable link carried by the body portion, a toothed member pivotally connected at its forward end to said tool and extending through said link, means carried by the body portion and engaging in said toothed member to arrest movement thereof, and means for adjusting said link whereby said member will be maintained in engagement with said first mentioned means and the tool locked from movement.

In testimony whereof I affix my signature in the presence of two witnesses:

EMERY WARGA MIHÓK.

Witnesses:
 LOUIS FARIS,
 JULIUS MOSSNY.